Dec. 21, 1954     J. A. FREDERICK     2,697,621
RING LOCKING MEANS
Filed June 21, 1950
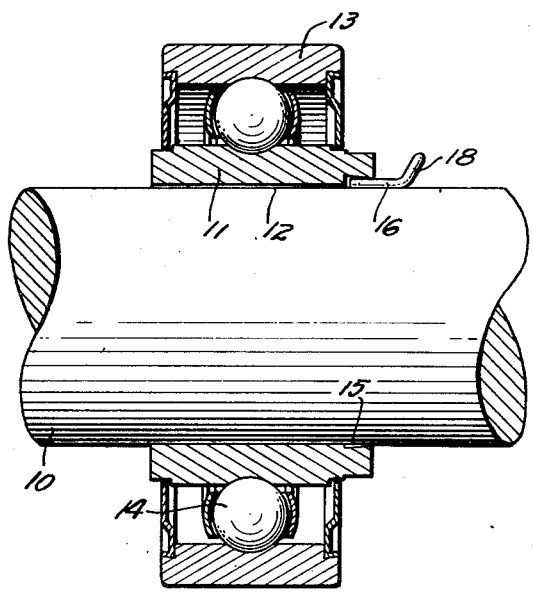
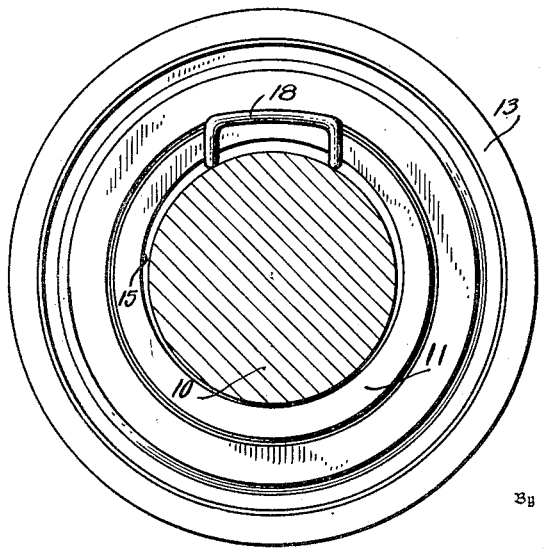
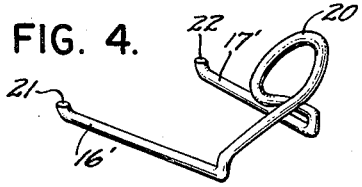
Inventor
JOHN A. FREDERICK
By Mitchell Bechert
Attorneys 2,697,621
Patented Dec. 21, 1954

2,697,621

RING LOCKING MEANS

John A. Frederick, Meriden, Conn., assignor to The Fafnir Bearing Company, New Britain, Conn., a corporation of Connecticut Application June 21, 1950, Serial No. 169,425

6 Claims. (Cl. 287—52.09)

My invention relates to locking means for securing a bearing ring or the like to a shaft or other mounting means.

It is an object of the invention to provide an improved device of the character indicated.

It is another object to provide a locking means of the character indicated which will involve substantially no additional axial length insofar as the accommodation of the inner bearing ring or the shaft is concerned.

It is also an object to provide an improved wire locking means of the character indicated.

It is a further object to provide an improved locking means which may be effective regardless of the direction of relative rotation of the bearing and the shaft or other mounting means.

Other objects and various further features of novelty and invention will be pointed out or will occur to those skilled in the art from a reading of the following specification in conjunction with the accompanying drawings. In said drawings, which show, for illustrative purposes only, preferred forms of the invention:

Fig. 1 is a longitudinal sectional view of a bearing secured to a shaft by means incorporating features of the invention;

Fig. 2 is a right-end view of the assembly of Fig. 1;

Fig. 3 is a perspective view of locking means employed in the assembly of Fig. 1; and Fig. 4 is a similar perspective view of a modified locking means of the invention.

Briefly stated, my invention contemplates an improved means which may be formed solely of wire for cooperation with an eccentric locking surface, which may be an eccentric counterbore at one axial end of an inner bearing ring; the wire may lock the ring to the shaft upon wedging contact between the counterbore and the shaft. The wire lock may include two more or less parallel prongs to be inserted in the clearance between the counterbore and the shaft, and the external connecting body which joins these prongs may include a part bent out of the general plane of the prongs for more ready finger or tool access, as for manipulation. In one form to be described, the locking means is generally U-shaped with the rounded part bent out of the plane of the prong ends; in the other form to be described, the locking means again includes prongs, but the body which joins the prongs includes a spring loop to promote added resiliency, so that the prongs may simultaneously make a wedging contact both sides of the point of maximum radial clearance of the counterbore with respect to the shaft.

Referring to Figs. 1, 2, and 3 of the drawings, my invention is shown in application to the mounting of an antifriction bearing upon a shaft 10. The bearing may include an inner ring 11 with a bore 12 accommodating the shaft 10. An outer bearing ring 13 may be spaced from the inner bearing ring 11 by antifriction elements 14. One axial end of the inner bearing ring 10 may be formed with an eccentric counterbore 15, and in the form shown the counterbore 15 is flared inwardly so that lesser radial clearances between the counterbore 15 and the shaft 10 may occur at the axial end of the inner bearing ring 11.

In accordance with the invention, I provide simple locking means for cooperation with the counterbore 15 and the shaft in order to lock the inner bearing ring 11 upon the shaft. The locking means may be a single pre-formed piece of wire, including two prongs 16—17 lying substantially in the same plane and extending generally parallel to each other. The prongs 16—17 may be integrally joined at one longitudinal end thereof, as by means of a simple curved body portion 18, and I prefer that the body portion 18 shall be bent upwardly and out of the general plane of the prongs 16—17, for purposes of access and of manipulation. The thickness of the wire, at least at the prong portions 16—17 thereof, is preferably intermediate the maximum and minimum radial clearances of the outer axial end of the counterbore 15 with respect to the shaft 10, and this thickness preferably approaches the said maximum clearance.

The wire of which prongs 16—17 are formed is preferably inherently resilient, so that the prongs 16—17 may be slightly compressed toward each other upon insertion into the counterbore-clearance space. It will be clear then that, upon release of the prongs 16—17, they may spring outwardly, and, upon a relative rotation of the shaft with respect to the inner bearing ring 11, one of the prongs 16—17 may bind or wedge between the counterbore 15 and the shaft 10. Upon relative rotation in the other direction the other of the prongs 16—17 may set up a similar bind. Thus, whatever the direction of relative rotation, my locking means may securely bind the inner bearing ring 11 to the shaft 10.

In Fig. 4, I show a slightly modified version of my locking means in which greater freedom of resilient angular spreading movement is afforded the locking prongs 16'—17'. The added resiliency is provided by including one or more spring loops 20 in the body portion integrally joining the prong ends 16'—17'. Again, I prefer that the body portion which joins the prongs 16'—17' shall be bent upwardly out the general plane of the prongs, to facilitate access and manipulation. For self-retaining purposes, the ends of the prongs 16'—17' may be slightly upwardly bent, as at 21—22. These portions 21—22 are preferably not bent up to an extent exceeding the amount of flare of the counterbore 15; thus, in cooperation with the flare of the counterbore 15, it will be appreciated that the bent-up ends 21—22 may serve axially to retain the locking means in assembled relation with the shaft 10 and with the inner bearing ring 11, even though the direction of relative rotation of these members may change, with resulting angular transfer of location of the lock, as from prong 16' to prong 17'.

In use, the prongs 16'—17' should be squeezed together for axial insertion in the region of maximum radial clearance between the counterbore 15 and the shaft 10. Once thus inserted, the prongs may be released to spring outwardly until they wedge between the counterbore and the shaft on both sides of the location of maximum radial clearance of the counterbore with respect to the shaft. It will be noted that, when thus urged outwardly, the retaining ends 21—22 will in effect exceed the clearance (at the end face of the bearing ring 11) between the counterbore and the shaft, so that axial loss of the locking means may be avoided even though the bind may be transferred from one prong to another upon a reversal of relative rotation of the parts.

It will be seen that I have provided simple wire-locking means which may secure a bearing on a shaft. The locking means is inexpensive to make, simple to install, and results in no damage to the bearing or to the shaft.

While I have described my invention in detail for the preferred forms shown, it will be understood that modifications may be made within the scope of the invention as defined in the appended claims.

I claim:

1. Means for locking a ring to a shaft, the ring having a bore to receive the shaft, said ring having an eccentric counterbore at one end, a lock member comprising a wire formed with two spaced apart prongs received in said counterbore in a generally axial direction and of a size intermediate the maximum and minimum radial clearance between the shaft and counterbore, whereby upon relative rotation between the ring and shaft in one direction one prong will be wedged between the shaft and counterbore to lock the ring to the shaft and upon relative rotation of the shaft and ring in the opposite direction the other prong will be wedged between the shaft and counterbore to lock the ring to the shaft, said wire intermediate and connecting the two prongs being positioned beyond the end of the ring, whereby it is outside of said ring where it may always be laid hold of to remove the prongs from the counterbore while the ring is in place on the shaft.

2. In a locking means as defined in claim 1, a part of said wire intermediate said prongs and positioned beyond the end of the ring being extended generally radially outwardly to facilitate engaging the same with the fingers or a tool.

3. In a locking means as defined in claim 1, said wire intermediate the prongs and positioned beyond the end of said ring being resilient and normally stressed to urge said prongs away from each other for the purpose described.

4. In a locking means as defined in claim 1, said prongs and the intermediate connecting portion of the wire locking member being of generally U-shape.

5. In a locking means as defined in claim 1, the intermediate connecting portion of said wire being resilient and formed into a spring loop to resiliently urge said prongs apart.

6. In a locking means as defined in claim 1, the end of at least one of said prongs being formed with a generally radially outwardly projecting portion engaging an undercut surface in said counterbore to hold the locking member more securely.

References Cited in the file of this patent

UNITED STATES PATENTS

| Number | Name | Date |
|---|---|---|
| 220,215 | Blackhall | Oct. 7, 1879 |
| 867,379 | Kaufmann | Oct. 1, 1907 |
| 1,220,185 | Cuthcart | Mar. 27, 1917 |
| 1,232,527 | Gemmill | July 10, 1917 |
| 1,788,891 | Runge | Jan. 31, 1931 |
| 1,909,230 | Smith | May 16, 1933 |
| 2,102,375 | Morton | Dec. 14, 1937 |
| 2,269,132 | Soderqvist | Jan. 6, 1942 |
| 2,290,484 | Potter | July 21, 1942 |
| 2,299,490 | Newman | Oct. 20, 1942 |
| 2,402,318 | Edwards | June 18, 1946 |
| 2,487,315 | Crampton | Nov. 8, 1949 |
| 2,548,355 | Dolejs | Apr. 10, 1951 |
| 2,557,518 | Simpson | June 19, 1951 |

FOREIGN PATENTS

| Number | Country | Date |
|---|---|---|
| 24,679 | Great Britain | of 1895 |